United States Patent

(12) United States Patent
Tomita et al.

(10) Patent No.: US 9,214,689 B2
(45) Date of Patent: Dec. 15, 2015

(54) OPERATION CONTROL DEVICE AND OPERATION CONTROL METHOD FOR FUEL CELL POWER PLANT

(75) Inventors: Yousuke Tomita, Yokohama (JP); Masashi Sato, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 984 days.

(21) Appl. No.: 13/382,339

(22) PCT Filed: Jun. 29, 2010

(86) PCT No.: PCT/JP2010/061364
§ 371 (c)(1),
(2), (4) Date: Jan. 5, 2012

(87) PCT Pub. No.: WO2011/004780
PCT Pub. Date: Jan. 13, 2011

(65) Prior Publication Data
US 2012/0107711 A1    May 3, 2012

(30) Foreign Application Priority Data

Jul. 7, 2009  (JP) ................................ 2009-160528

(51) Int. Cl.
H01M 8/04    (2006.01)
H01M 8/10    (2006.01)

(52) U.S. Cl.
CPC ........ *H01M 8/04798* (2013.01); *H01M 8/0494* (2013.01); *H01M 8/04388* (2013.01);
(Continued)

(58) Field of Classification Search
CPC ....................................................... H01M 8/04
USPC ............................................................ 429/446
See application file for complete search history.

(56) References Cited

U.S. PATENT DOCUMENTS

2004/0121218 A1    6/2004    Andrews
2005/0100777 A1    5/2005    Gurin et al.
(Continued)

FOREIGN PATENT DOCUMENTS

CN    1536699 A    10/2004
CN    101283474 A    10/2008
(Continued)

OTHER PUBLICATIONS

Machine translation of Japanese Patent Publication No. 2007-048479, (Feb. 22, 2007).
(Continued)

*Primary Examiner* — Ula C Ruddock
*Assistant Examiner* — Daniel Gatewood
(74) *Attorney, Agent, or Firm* — Foley & Lardner LLP

(57) ABSTRACT

A fuel cell power plant stops anode gas supply to a fuel cell stack 1 by an anode gas supply mechanism 20 when an anode gas pressure in the fuel cell stack 1 reaches an upper limit pressure, and resumes supplying the anode gas by the anode gas supply mechanism 20 when the anode gas pressure in the fuel cell stack 1 lowers to a lower limit pressure. A sensor 52-54 detects if a hydrogen supply amount supplied to the fuel cell stack 1 satisfies a required amount to generate a target generated power, and a controller 51 corrects the lower limit pressure in an increasing direction when the hydrogen supply amount does not satisfy the required amount, thereby suppressing a generated power of the fuel cell stack 1 from reducing even when a flooding takes place in the fuel cell stack 1.

20 Claims, 14 Drawing Sheets

(52) U.S. Cl.
CPC ...... *H01M 8/04395* (2013.01); *H01M 8/04447* (2013.01); *H01M 8/04455* (2013.01); *H01M 8/04559* (2013.01); *H01M 8/04589* (2013.01); *H01M 8/04619* (2013.01); *H01M 8/04753* (2013.01); *H01M 8/04089* (2013.01); *H01M 2008/1095* (2013.01); *Y02E 60/50* (2013.01)

(56) References Cited

U.S. PATENT DOCUMENTS

| 2005/0123811 | A1 | 6/2005 | Gottwick |
| 2009/0110981 | A1 | 4/2009 | Saito et al. |

FOREIGN PATENT DOCUMENTS

| EP | 1 473 789 | A2 | | 7/2003 |
| EP | 2 357 699 | A1 | | 8/2011 |
| JP | 2007-48479 | A | | 2/2007 |
| JP | 2007-157375 | A | | 6/2007 |
| JP | 2008-108536 | A | | 5/2008 |
| JP | 2008108536 | A | * | 5/2008 |
| JP | 2008-218265 | A | | 9/2008 |
| JP | 2010-129207 | A | | 6/2010 |
| JP | 2010129207 | A | * | 6/2010 |

OTHER PUBLICATIONS

Machine translation of Japanese Patent Publication No. 2007-157375, (Jun. 21, 2007).

Chinese Office Action dated Nov. 5, 2013, (5 pgs.).

Supplementary European Search Report dated Mar. 5, 2014 (8 pgs.).

* cited by examiner

OPERATION CONTROL DEVICE AND OPERATION CONTROL METHOD FOR FUEL CELL POWER PLANT

FIELD OF THE INVENTION

This invention relates to operation control of a fuel cell power plant.

BACKGROUND OF THE INVENTION

JP2007-48479A, published by the Japan Patent Office in 2007, discloses an operation control device for a fuel cell power plant which performs a pressure pulsation operation on an anode gas. A pressure pulsation operation is an operation method in which an internal pressure of a fuel cell stack is caused to pulsate between an upper limit pressure and a lower limit pressure by halting an anode gas supply to the fuel cell stack when a pressure of the anode gas reaches the upper limit pressure and restarting the anode gas supply when the pressure of the anode gas falls to the lower limit pressure. With this prior art technique, it is possible to promote the discharge of water generated in the fuel cell stack along a pressure gradient formed as the pressure falls during the pressure pulsation operation.

SUMMARY OF THE INVENTION

According to research conducted by the inventors, anode gas pressure pulsation may exacerbate an adverse effect that flooding in the fuel cell stack has on a power generation capacity. More specifically, when a pressure reduction is performed toward the lower limit pressure of the anode gas in a condition where the fuel cell stack is flooded with generated water, the amount of anode gas that can be used by an anode decreases. As a result, it may be impossible to obtain the amount of anode gas required to generate a target amount of power, leading to a reduction in generated power.

It is therefore an object of this invention to realize pressure pulsation operation control in a fuel cell stack with which a generated power of the fuel cell stack can be recovered quickly even when flooding occurs.

In order to achieve the above object, this invention provides an operation control device for a fuel cell power plant, which controls a generated power of a fuel cell stack that performs power generation using hydrogen on the basis of a target generated power, comprising an anode gas supply mechanism that supplies an anode gas containing hydrogen to the fuel cell stack, a sensor detects a power generation condition of the fuel cell stack, and a programmable controller.

The programmable controller is programmed to control the anode gas supply mechanism to cause an anode gas pressure in the fuel cell stack to pulsate between an upper limit pressure and a lower limit pressure, determine on the basis of the power generation condition of the fuel cell stack whether or not the hydrogen supply amount supplied to the fuel cell stack satisfied an amount required to generate the target generated power, and correct the lower limit pressure in an increasing direction when the hydrogen supply amount does not satisfy the amount required to generate the target generated power.

This invention also provides an operation control method for the fuel cell power plant described above, comprising supplying an anode gas containing hydrogen to a fuel cell stack, detecting a power generation condition of the fuel cell stack, controlling an anode gas supply mechanism to cause an anode gas pressure in the fuel cell stack to pulsate between an upper limit pressure and a lower limit pressure determining on the basis of the power generation condition of the fuel cell stack whether or not the hydrogen supply amount supplied to the fuel cell stack satisfied an amount required to generate the target generated power, and correcting the lower limit pressure in an increasing direction when the hydrogen supply amount does not satisfy the amount required to generate the target generated power.

The details as well as other features and advantages of this invention are set forth in the remainder of the specification and are shown in the accompanying drawings.

DESCRIPTION OF THE PREFERRED EMBODIMENTS

Figure 1:
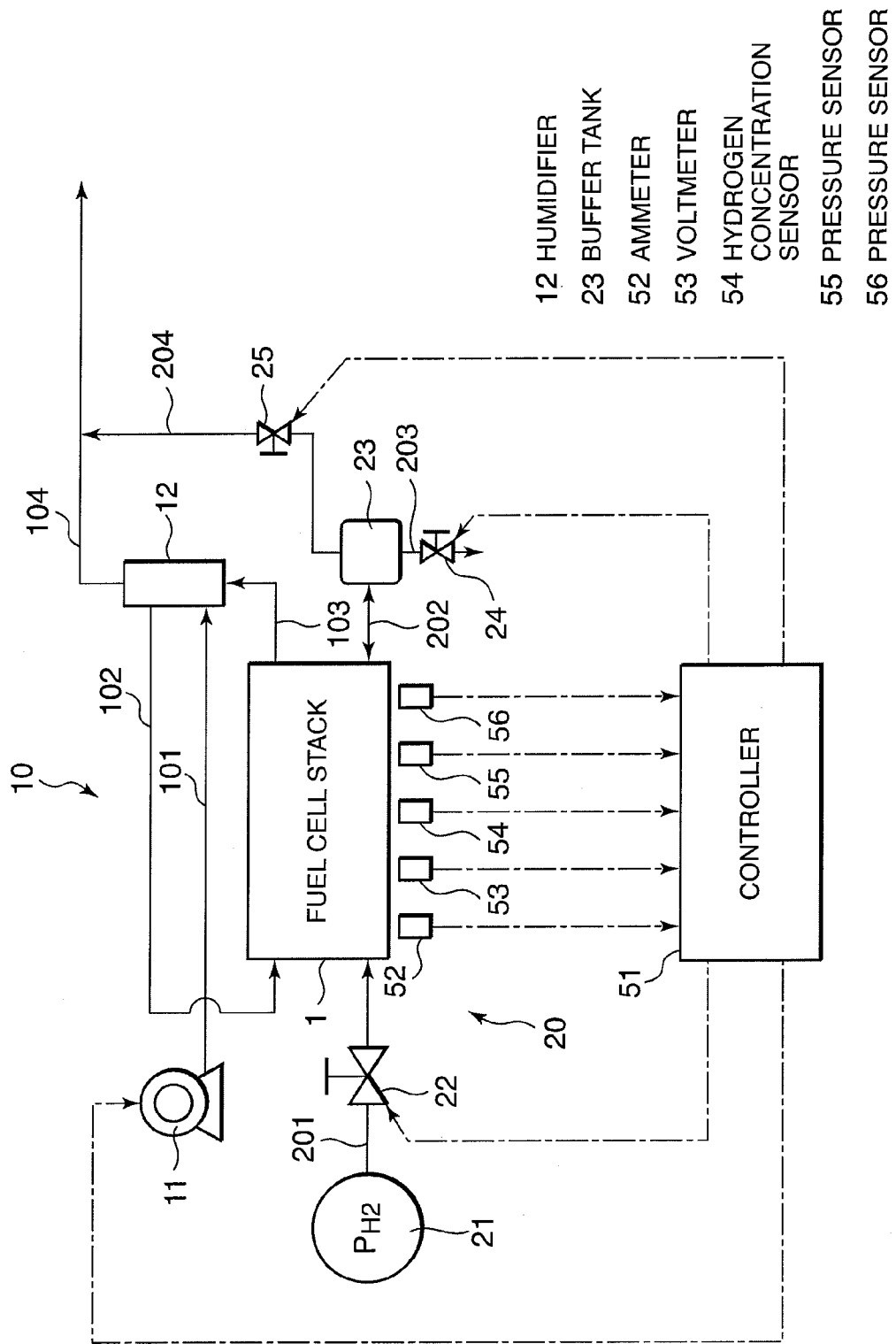
FIG. 1 is a schematic diagram of a fuel cell power plant to which this invention is applied.

Referring to FIG. 1 of the drawings, a fuel cell power plant includes a fuel cell stack 1 having an anode and a cathode, a cathode line 10 that supplies a cathode gas containing oxygen to the cathode of the fuel cell stack 1 and discharges a cathode effluent gas from the fuel cell stack 1, and an anode line 20 that supplies an anode gas having hydrogen as a main component to the anode of the fuel cell stack 1 and discharges the anode gas from the fuel cell stack 1.

The fuel cell power plant is a well-known so-called anode dead end type power plant that performs a pressure-increasing stroke for raising a pressure of the anode gas in the fuel cell stack 1 and a pressure-reducing stroke for lowering the pressure of the anode gas in the fuel cell stack 1 alternately. This operation generates pressure pulsation in the anode gas. The anode gas discharged from the fuel cell stack 1 is resupplied to the anode in the pressure-reducing stroke, and therefore anode gas discharge to the outside can be suppressed to a minimum.

In the fuel cell power plant, when a nitrogen concentration of the cathode of the fuel cell stack 1 is higher than the nitrogen concentration of the anode, nitrogen gas is transmitted from the cathode to the anode via a polymer electrolyte. In an anode dead end type fuel cell stack, the nitrogen gas transmitted to the anode may accumulate downstream of an anode gas passage, thereby impairing power generation in the fuel cell stack 1. Therefore, anode gas pressure pulsation is preferable for discharging nitrogen gas that has accumulated downstream of the anode gas passage to the outside of the fuel cell stack 1. When the nitrogen gas is discharged from the fuel cell stack 1, a ratio between a total gas amount and a hydrogen gas amount of the anode gas can be brought close to a stoichiometric ratio (SR). This effect cannot be obtained simply by keeping the pressure of the anode gas high.

To make anode gas pressure pulsation possible, the anode line 20 comprises a high-pressure hydrogen tank 21, an anode gas supply passage 201, a hydrogen pressure regulating valve 22, an anode gas discharge passage 202, a buffer tank 23, a water discharge passage 203, a water discharge valve 24, a purge passage 204, and a purge valve 25.

The hydrogen tank 21 is disposed at an upstream end of the anode gas supply passage 201.

The hydrogen pressure-adjusting valve 22 is disposed in the anode gas supply passage 201 that connects the hydrogen tank 21 to the fuel cell stack 1. The hydrogen pressure-adjusting valve 22 adjusts the pressure of the anode gas supplied from the hydrogen tank 21 and supplies the anode gas having a favorable pressure to the fuel cell stack 1.

The anode gas discharge passage 202 connects the fuel cell stack 1 to the buffer tank 23. A volume of the buffer tank 23 is set to be identical to or approximately 80% of a volume of the anode gas passage of the fuel cell stack 1. The buffer tank 23 stores the anode gas discharged from the fuel cell stack 1. The anode gas discharged from the fuel cell stack 1 contains moisture generated by the cathode and transmitted from the cathode to the anode through the polymer electrolyte. The buffer tank 23 separates the moisture from the anode gas. The accumulated nitrogen gas downstream of the anode gas passage is also intermixed with the anode gas by the pressure pulsation. The buffer tank 23 also has a function for separating the nitrogen gas from the anode gas.

The water discharge passage 203 is connected to a bottom surface of the buffer tank 23. The water discharge valve 24 is disposed in the water discharge passage 203. The water discharge valve 24 discharges liquid water separated from the anode gas and accumulated in the buffer tank 23 to the outside of the buffer tank 23.

The purge passage 204 is connected to a crown surface of the buffer tank 23. The purge valve 25 is disposed in the purge passage 204. The purge valve 25 purges inert gases such as nitrogen that have accumulated in an upper portion of the buffer tank 23 into a purge passage 104 via the purge passage 204. A purge flow rate is adjusted by varying an opening of the purge valve 25 continuously or intermittently.

The cathode line 10 includes a cathode gas passage 101, a compressor 11, a humidifier 12, a cathode gas supply passage 102, and a cathode gas discharge passage 103.

The compressor 11 is disposed at an upstream end of the cathode gas passage 101. The compressor 11 compresses air and supplies the compressed air to the humidifier 12.

The humidifier 12 is connected to the compressor 11 via the cathode gas passage 101. The cathode gas supply passage 102, the cathode gas discharge passage 103, and the aforesaid purge passage 104 are also connected to the humidifier 12.

The humidifier 12 humidifies the compressed air sent thereto from the compressor 11 via the cathode gas passage 101 using moisture contained in the cathode effluent gas discharged from the fuel cell stack 1 via the cathode gas discharge passage 103. The humidified compressed air is supplied to the cathode of the fuel cell stack 1 via the cathode gas supply passage 102 as cathode gas. In the cathode of the fuel cell stack 1, the cathode gas reacts with hydrogen ions permeating the polymer electrolyte to generate water. Therefore, following the reaction, the cathode effluent gas contains a large amount of moisture. The cathode effluent gas containing the humidified compressed air is discharged into the atmosphere from the purge passage 104.

An operation control device according to this invention, which is used together with the fuel cell power plant configured as described above, includes an ammeter 52 that detects a load current I of the fuel cell stack 1, a voltmeter 53 that detects a stack voltage V of the fuel cell stack 1, a hydrogen concentration sensor 54 that detects a hydrogen concentration of the anode gas in the fuel cell stack 1, a pressure sensor 55 that detects an anode gas pressure Pa in the fuel cell stack 1, and a programmable controller 51. Detection values from the respective sensors 52 to 55 are input into the controller 51 via a signal circuit.

The controller 51 is constituted by a microcomputer including a central processing unit (CPU), a read only memory (ROM), a random access memory (RAM), and an input/output interface (I/O interface). The controller may be constituted by a plurality of microcomputers.

The controller 51 determines whether or not the amount of anode gas supplied to the fuel cell stack 1 satisfies an amount required to realize a target generated power of the fuel cell stack 1 on the basis of a detection signal from one or a plurality of the sensors 52-54. More specifically, when the load current/detected by the ammeter 52 equals or exceeds a predetermined current, when the stack voltage V equals or exceeds a predetermined voltage, or when the hydrogen concentration of the anode gas in the fuel cell stack 1 equals or exceeds a predetermined concentration, it is determined that the amount of anode gas supplied to the fuel cell stack 1 satisfies the amount required to realize the target generated power of the fuel cell stack 1. When none of these cases is established, it is determined that the amount of anode gas supplied to the fuel cell stack 1 does not satisfy the amount required to realize the target generated power of the fuel cell stack 1.

The controller 51 controls the pressure of the anode gas in the fuel cell stack 1 in accordance with the result of the above determination. More specifically, the controller 51 controls openings or opening/closing of the hydrogen pressure regulating valve 22, the water discharge valve 24, and the purge valve 25. Further, the controller 51 controls the pressure of the cathode gas in the fuel cell stack 1 by controlling an operation of the compressor 11.

Figure 2:
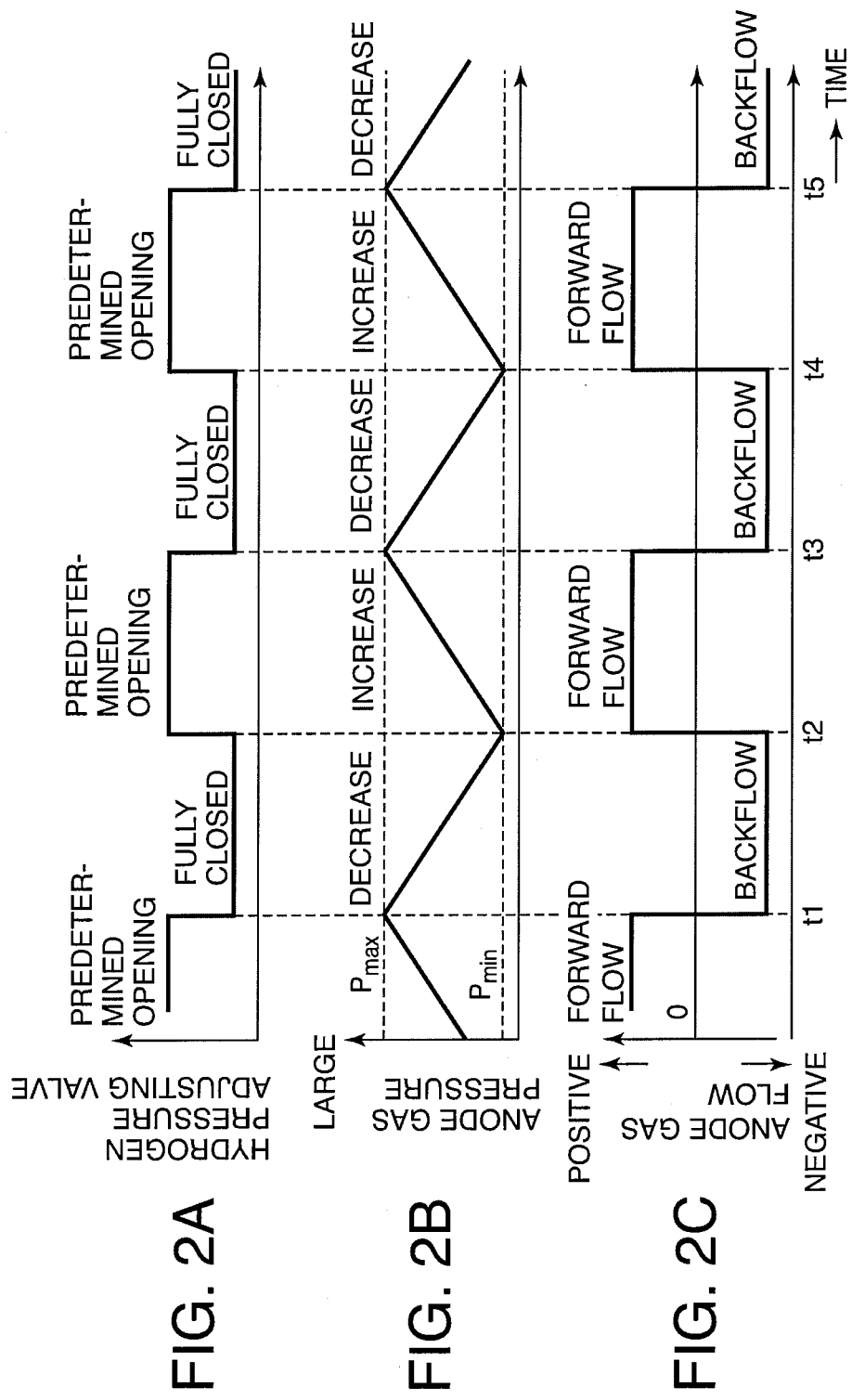
FIGS. 2A to 2C are timing charts illustrating a normal operation of an anode dead end type fuel cell stack.

Referring to FIGS. 2A-2C, a normal operation of the fuel cell stack 1 will be described.

As shown in FIG. 2A, when the hydrogen pressure regulating valve 22 is opened to a predetermined opening during a power generation operation in the fuel cell stack 1, the pressure of the anode gas in the fuel cell stack 1 is increased as shown in FIG. 2B by anode gas supplied from the hydrogen tank 21 through the anode gas supply passage 201. A part of the hydrogen contained in the anode gas is consumed by the fuel cell stack 1, and the remaining anode gas flows into the buffer tank 23 as the anode gas through the anode gas discharge passage 202, as shown in FIG. 2C. In the following description, this flow of anode gas through the anode gas discharge passage 202 will be referred to as a forward flow.

After passing through the fuel cell stack 1, the anode gas contains impurities such as generated water and nitrogen transmitted through the fuel cell stack 1 from the cathode to the anode. Of the impurities contained in the anode gas that flows into the buffer tank 23, the generated water condenses in the buffer tank 23 to form liquid water that accumulates in the lower portion of the buffer tank 23. The nitrogen and unreacted anode gas accumulate in the upper portion of the buffer tank 23. The buffer tank 23 has a sufficient volume to store these impurities.

When the amount of generated water accumulated in the buffer tank 23 increases, the controller 51 opens the water discharge valve 24 to discharge the generated water to the outside of the buffer tank 23 through the water discharge passage 203. When the amount of nitrogen accumulated in the buffer tank 23 increases, the controller 51 opens the purge valve 25 to discharge the nitrogen to the outside of the buffer tank 23 through the purge passage 204.

As shown in FIG. 2B, the increasing anode gas pressure reaches an upper limit pressure Pmax at a time t1. When the anode gas pressure reaches the upper limit pressure Pmax, the controller 51 closes the hydrogen pressure-adjusting valve 22 fully, as shown in FIG. 2A, to halt the anode gas supply to the fuel cell stack 1. The anode gas is consumed by the anode during the power generation operation of the fuel cell stack 1, and therefore the anode gas pressure Pa falls from the time t1 onward, as shown in FIG. 2B. When the anode gas pressure Pa of the fuel cell stack 1 falls, anode gas flows from the buffer tank 23 into the fuel cell stack 1 through the anode gas discharge passage 202, as shown in FIG. 2C. In the following description, this flow of anode gas through the anode gas discharge passage 202 will be referred to as a backflow.

When the anode gas pressure Pa in the fuel cell stack 1 falls to a lower limit pressure Pmin at a time t2 after fully closing the hydrogen pressure adjusting valve 22, the controller 51 reopens the hydrogen pressure adjusting valve 22 to the predetermined opening, as shown in FIG. 2A, such that the anode gas supply to the fuel cell stack 1 from the hydrogen tank 21 is restarted. As a result of this operation, the anode gas pressure Pa in the fuel cell stack 1 increases again such that the anode gas discharged from the fuel cell stack 1 flows into the buffer tank 23 through the anode gas discharge passage 202, as shown in FIG. 2C.

At a time t3, the anode gas pressure Pa of the fuel cell stack 1 reaches the upper limit pressure Pmax again. Accordingly, the controller 51 fully closes the hydrogen pressure-adjusting valve 22 again to halt the anode gas supply to the fuel cell stack 1 from the hydrogen tank 21. Thereafter, as shown in FIG. 2B, the anode gas pressure Pa in the fuel cell stack 1 decreases as the hydrogen contained in the anode gas is consumed in accordance with the power generation operation of the fuel cell stack 1. In accordance with this pressure reduction, the anode gas stored in the buffer tank 23 flows back into the fuel cell stack 1 through the anode gas discharge passage 202, as shown in FIG. 2C.

Hence, by operating the hydrogen pressure adjusting valve 22 to open and close, the controller 51 performs a pulsation operation in which the anode gas pressure Pa in the fuel cell stack 1 increases and decreases repeatedly. After the anode gas discharged from the fuel cell stack 1 flows into the buffer tank 23 in the forward flow, the anode gas is resupplied to the fuel cell stack 1 in the backflow. As a result, the anode gas, excluding the nitrogen and generated water contained therein, circulates between the fuel cell stack 1 and the buffer tank 23 without being discharged to the outside. Through the processes described above, an anode dead end operation is executed in the fuel cell power plant.

Incidentally, according to research conducted by the inventors, when the pressure of the anode gas is increased and reduced repeatedly in a condition where the fuel cell stack 1 is flooded with the generated water, the amount of anode gas required to generate the target power may not be supplied to the anode during the pressure reduction, and as a result, the amount of power generated by the fuel cell stack 1 may decrease.

To prevent a reduction in the generated power of the fuel cell stack 1 occurring when a pressure pulsation operation is performed in a flooded condition, the controller 51 controls a reactant gas pressure by operating the hydrogen pressure adjusting valve 22 to open and close as follows.

Figure 3:
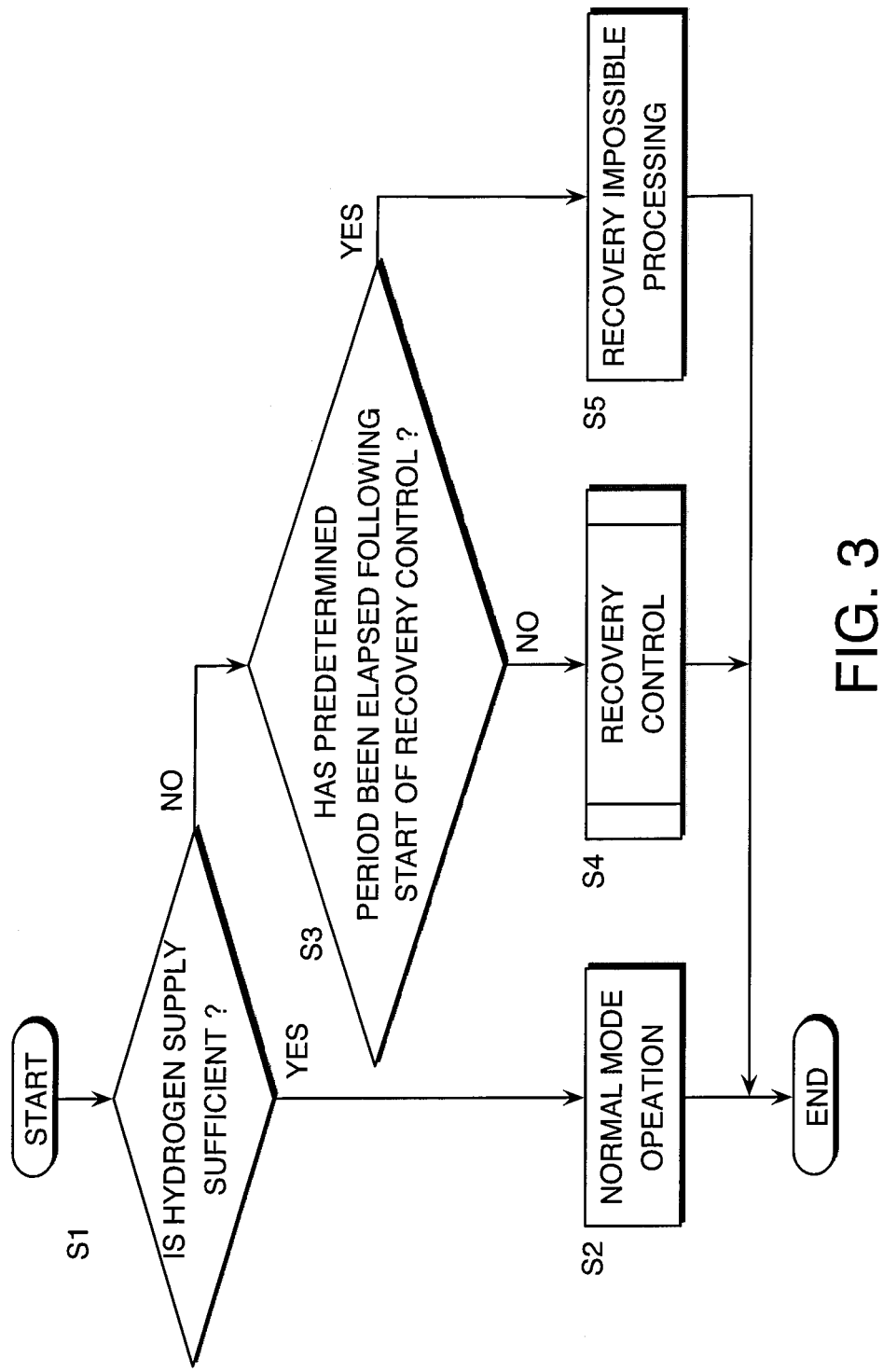
FIG. 3 is a flowchart illustrating a reactant gas pressure control routine executed by a controller according to this invention.

Referring to FIG. 3, a reactant gas pressure control routine executed by the controller 51 for this purpose will be described. This routine is executed repeatedly at fixed time intervals of 10 milliseconds, for example, while the fuel cell power plant is operative.

In a step S1, the controller 51 determines whether or not an amount of hydrogen required in an electrochemical reaction for generating the target generated power of the fuel cell stack 1 is being supplied. More specifically, the load current I of the fuel cell stack 1, detected by the ammeter 52, the stack voltage V detected by the voltmeter 53, and the hydrogen concentration of the anode gas, detected by the hydrogen concentration sensor 54, are compared with their respective predetermined values, and when the predetermined values are not satisfied, it is determined that the amount of hydrogen required in the electrochemical reaction for generating the target generated power is not being supplied.

The determination may be made on the basis of an output of any one of the sensors 52-54. Alternatively, outputs of a plurality of the sensors may be compared with their respective predetermined values. In the latter case, it may be determined that the anode gas amount is insufficient when the output of any one of the sensors is smaller than its predetermined value or that the anode gas amount is insufficient when the outputs of all of the sensors are smaller than their respective predetermined values.

Instead of measuring the load current I, respective power generation currents in a plurality of sections of the fuel cell stack 1 may be measured using a plurality of ammeters, and the determination as to whether or not the anode gas amount is insufficient may be made on the basis of a current distribution thereof. Instead of measuring the stack voltage V, voltages of respective cells constituting the fuel cell stack 1 may be measured individually, and the determination as to whether or not the anode gas amount is insufficient may be made on the basis of an average value or a minimum value of the voltages of the respective cells. Further, the determination as to whether or not the anode gas amount is insufficient may be made by measuring the voltage of a specific cell.

When it is determined in the step S1 that the hydrogen supply amount is not insufficient, the controller 51 performs anode gas pressure pulsation operation control in a normal mode in a step S2. More specifically, the controller 51 controls the opening and closing operations of the hydrogen pressure adjusting valve 22 so that the anode gas pressure Pa pulsates between the upper limit pressure Pmax and the lower limit pressure Pmin, as shown in FIGS. 2A-2C. This operation is identical to a conventionally performed operation, and therefore description thereof has been omitted.

When it is determined in the step S1 that the hydrogen supply amount is insufficient, the controller 51 performs recovery control on the anode gas pressure Pa in steps S3-S5.

In the step S3, the controller 51 determines whether or not a predetermined time has elapsed following the start of the recovery control.

Figure 4:
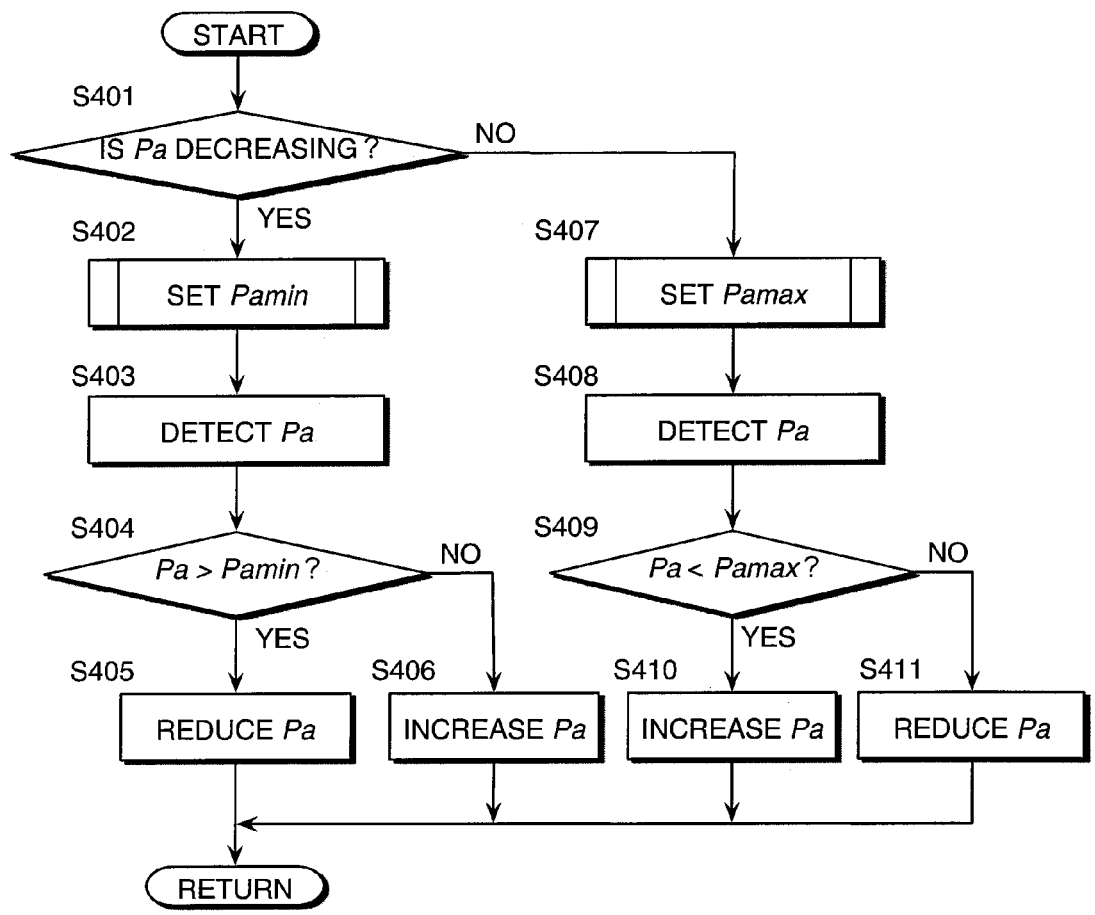
FIG. 4 is a flowchart illustrating a recovery mode sub-routine executed by the controller.

When the determination of the step S3 is negative, the controller 51 executes a recovery mode sub-routine shown in FIG. 4 in the step S4. When the determination of the step S3 is affirmative, the controller 51 performs recovery impossible processing in the step S5.

Here, the recovery impossible processing is processing performed when the deficiency in the anode gas amount is not resolved even when the recovery mode sub-routine is executed for a predetermined time. Specifically, the controller 51 performs processing to open the purge valve 25 or reduce a load voltage of the fuel cell stack 1. When the purge valve 25 is opened, the hydrogen concentration of the anode gas increases, leading to an increase in the voltage of each cell. When the load voltage of the fuel cell stack 1 is reduced, the required amount of anode gas decreases, leading to an increase in the voltage of each cell.

Following the processing of the step S2, S4 or S5, the controller 51 terminates the routine.

Referring to FIG. 4, the recovery mode sub-routine executed by the controller 51 in the step S4 will be described.

In a step S401, the controller 51 determines whether or not the anode gas pressure Pa in the fuel cell stack 1 is decreasing. When the determination of the step S401 is affirmative, the controller 51 performs processing of steps S402-S406. When the determination of the step S401 is negative, the controller 51 performs processing of steps S407-S411.

Figure 5:
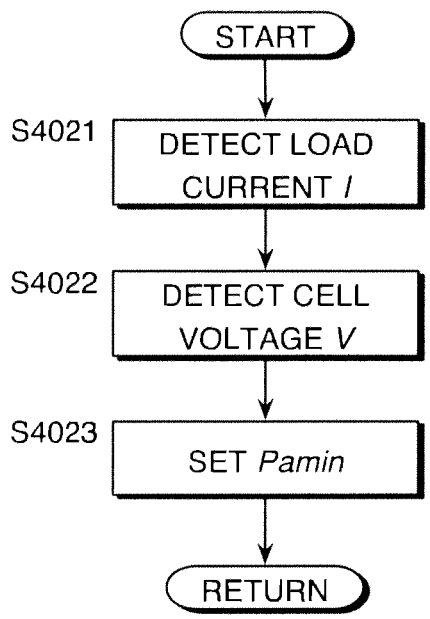
FIG. 5 is a flowchart illustrating a recovery mode lower limit anode gas pressure setting sub-routine executed by the controller.

In the step S402, the controller 51 sets a recovery mode lower limit anode gas pressure Pamin by executing a recovery mode lower limit anode gas pressure setting sub-routine shown in FIG. 5.

Referring to FIG. 5, in a step S4021, the controller 51 detects the load current I of the fuel cell stack 1 from an output signal of the ammeter 52.

In a step S4022, the controller 51 detects the stack voltage V from an output signal of the voltmeter 53.

Figure 7:
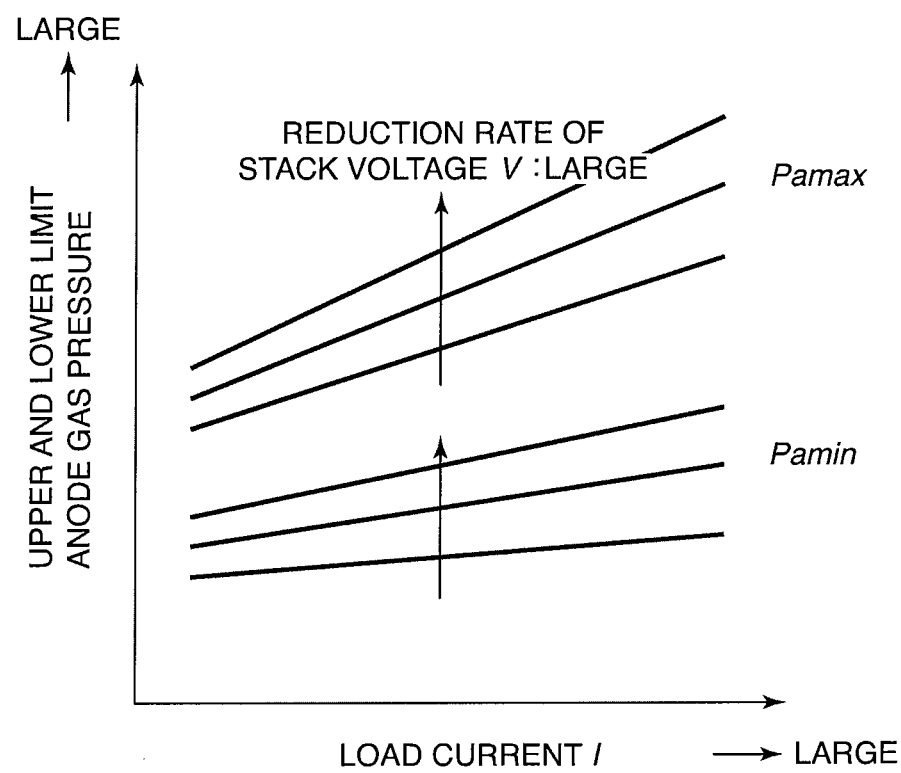
FIG. 7 is a diagram showing characteristics of a map of the recovery mode lower limit anode gas pressure and the recovery mode upper limit anode gas pressure, which is stored by the controller.

In a step S4023, the controller 51 determines the recovery mode lower limit anode gas pressure Pamin from the load current I and the stack voltage V of the fuel cell stack 1 by referring to a map having characteristics shown in FIG. 7, which is stored in the ROM in advance. Here, the map is set in advance such that the recovery mode lower limit anode gas pressure Pamin is higher than the lower limit pressure Pmin applied during the pressure pulsation operation in the normal mode.

Following the processing of the step S4023, the controller 51 terminates the recovery mode lower limit anode gas pressure setting sub-routine.

Referring back to FIG. 4, after setting the recovery mode lower limit anode gas pressure Pamin by executing the recovery mode lower limit anode gas pressure setting sub-routine, the controller 51 detects the anode gas pressure Pa in the fuel cell stack 1 from an output signal of the pressure sensor 55 in the step S403.

Next, in the step S404, the controller 51 determines whether or not the anode gas pressure Pa is higher than the recovery mode lower limit anode gas pressure Pamin set in the step S402.

When the determination of the step S404 is affirmative, the controller 51 reduces the anode gas pressure in the step S405. More specifically, the controller 51 either closes the hydrogen pressure-regulating valve 22 or maintains the hydrogen pressure-regulating valve 22 in a closed condition. When the hydrogen pressure-regulating valve 22 is closed, the anode gas pressure decreases by a fixed amount at a time as hydrogen is consumed in the fuel cell stack 1.

When the determination of the step S404 is negative, the controller 51 increases the anode gas pressure in the step S406. More specifically, the controller 51 opens the hydrogen pressure-regulating valve 22 to the aforementioned predetermined opening. As a result of this processing, the anode gas supply amount from the high-pressure hydrogen tank 21 to the fuel cell stack 1 increases, leading to an increase in the anode gas pressure Pa in the fuel cell stack 1.

Following the processing of the step S405 or S406, the controller 51 terminates the recovery mode sub-routine.

Figure 6:
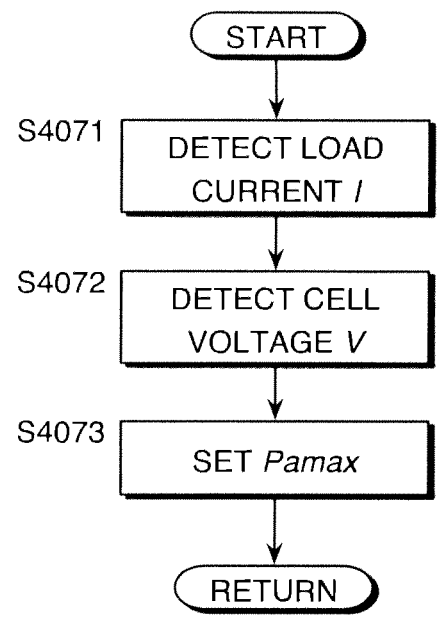
FIG. 6 is a flowchart illustrating a recovery mode upper limit anode gas pressure setting sub-routine executed by the controller.

In the step S407, on the other hand, the controller 51 sets a recovery mode upper limit anode gas pressure Pamax by executing a recovery mode upper limit anode gas pressure setting sub-routine shown in FIG. 6.

Referring to FIG. 6, in a step S4071, the controller 51 detects the load current of the fuel cell stack 1 from the output signal of the ammeter 52.

In a step S4072, the controller 51 detects the stack voltage V from the output signal of the voltmeter 53.

In a step S4073, the controller 51 determines the recovery mode upper limit anode gas pressure Pamax from the load current I and the stack voltage V of the fuel cell stack 1 by referring to the map having the characteristics shown in FIG. 7, which is stored in the ROM in advance. Here, the map is set in advance such that the recovery mode upper limit anode gas pressure Pamax is higher than the upper limit pressure Pmax applied during the pressure pulsation operation in the normal mode.

Following the processing of the step S4073, the controller 51 terminates the recovery mode upper limit anode gas pressure setting sub-routine.

Referring back to FIG. 4, after setting the recovery mode upper limit anode gas pressure Pamax by executing the recovery mode upper limit anode gas pressure setting sub-routine, the controller 51 detects the anode gas pressure Pa in the fuel cell stack 1 from the output signal of the pressure sensor 55 in the step S408.

Next, in the step S409, the controller 51 determines whether or not the anode gas pressure Pa is lower than the recovery mode upper limit anode gas pressure Pamax set in the step S407.

When the determination of the step S409 is affirmative, the controller 51 increases the anode gas pressure in the step S410. Specific processing content of the pressure increasing operation is identical to the step S406.

When the determination of the step S409 is negative, the controller 51 reduces the anode gas pressure in the step S411. Specific processing content of the pressure reducing operation is identical to the step S405.

Following the processing of the step S410 or S411, the controller 51 terminates the recovery mode sub-routine.

The map of the recovery mode lower limit anode gas pressure and the recovery mode upper limit anode gas pressure, which has the characteristics shown in FIG. 7 and is stored in the ROM of the controller 51 in advance, is created by predetermining, through experiments and simulations, a lower limit pressure and an upper limit pressure of the pressure pulsation at which the amount of generated power does not decrease further with respect to each load current I and stack voltage V in various fuel cell stacks.

Referring to FIG. 7, with respect to the recovery mode lower limit anode gas pressure Pamin on the map, a steadily larger value is applied to the recovery mode lower limit anode gas pressure Pamin as the deficiency in the amount of anode gas increases, or in other words as the reduction in the stack voltage V increases. Further, a steadily larger value is applied to the recovery mode lower limit anode gas pressure Pamin as the load current I of the fuel cell stack 1 increases.

With respect to the recovery mode upper limit anode gas pressure Pamax, on the other hand, a steadily larger value is applied to the recovery mode upper limit anode gas pressure Pamax as the deficiency in the amount of anode gas increases, or in other words as the reduction in the stack voltage V increases. Further, a steadily larger value is applied to the recovery mode upper limit anode gas pressure Pamax as the load current I of the fuel cell stack 1 increases.

The characteristics of the map are preferably set such that with respect to a constant deficiency in the amount of anode gas, a differential pressure between the recovery mode upper limit anode gas pressure Pamax and the upper limit pressure Pmax in the normal mode is equal to or greater than a differential pressure between the recovery mode lower limit anode gas pressure Pamin and the lower limit pressure Pmin in the normal mode. By setting the characteristics of the map in this manner, a center value of the pressure pulsation in the recovery mode varies further toward a pressure increasing direction than a center value of the pressure pulsation in the normal mode, and therefore recovery of the reduced generated power can be promoted more forcefully.

Figure 8:
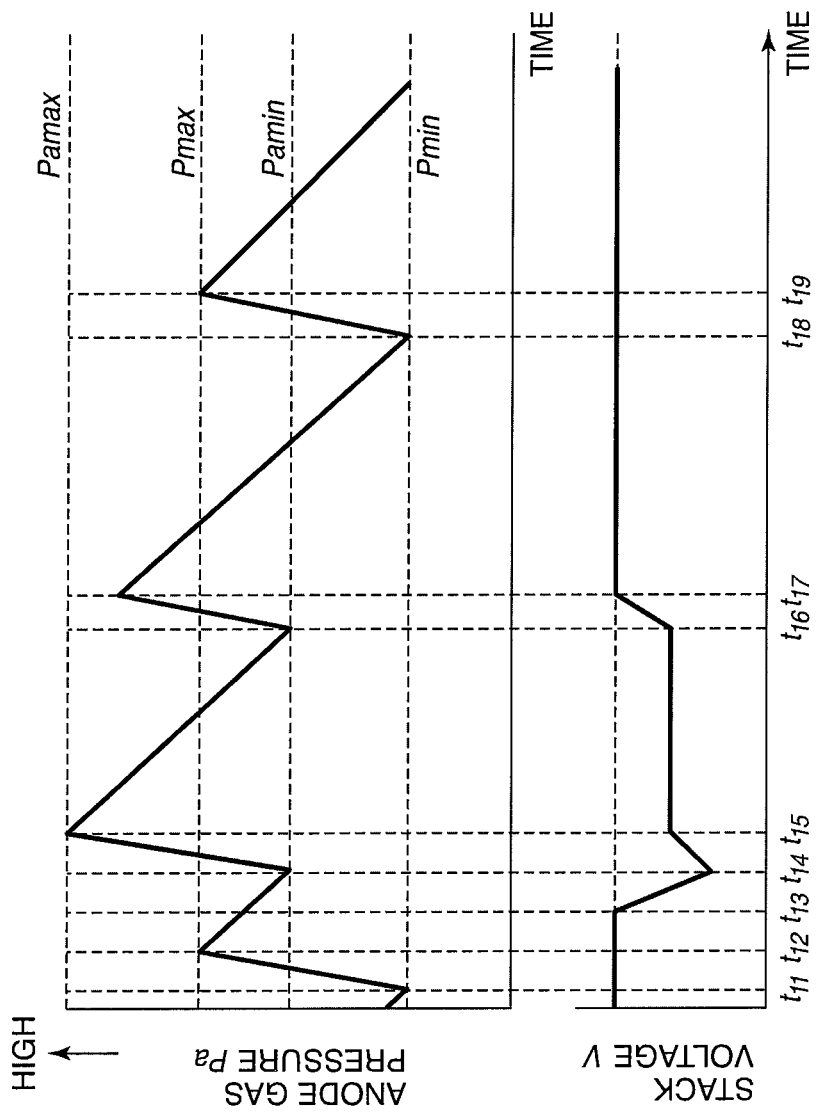
FIGS. 8A and 8B are timing charts illustrating results of the reactant gas pressure control executed by the controller.

Through the reactant gas pressure control executed by the controller 51 as described above, the anode gas pressure in the fuel cell stack 1 varies as shown in FIGS. 8A and 8B.

On these timing charts, the fuel cell stack 1 maintains the target generated power until a time t13, as shown in FIG. 8B. In this condition, the determination of the step S1 is affirmative, and therefore the controller 51 performs anode gas pressure pulsation operation control in the normal mode in the step S2.

As a result, the anode gas pressure in the fuel cell stack 1 pulsates between the upper limit pressure Pmax and the lower limit pressure Pmin of the normal mode, shown in FIG. 8A.

As shown in FIG. 8B, when the stack voltage V decreases from the time t13, the determination of the step S1 becomes negative, and therefore the controller 51 performs the anode gas pressure recovery control processing in the steps S3 and S4. As shown in FIG. 8A, an anode gas pressure reduction operation is performed at the time t13, and therefore an affirmative result is obtained in the determination of the step S401 in FIG. 4, which is executed during the recovery mode sub-routine of the step S4.

The controller 51 sets the recovery mode lower limit anode gas pressure Pamin by executing the recovery mode lower limit anode gas pressure setting sub-routine of FIG. 5 in the step S402. The controller 51 performs the determination of the step S404 during every execution of the routine, and while the determination remains affirmative, repeats the pressure reducing processing of the step S405 in FIG. 4. As a result, the anode gas pressure Pa decreases continuously until the anode gas pressure Pa reaches the recovery mode lower limit anode gas pressure Pamin. The recovery mode lower limit anode gas pressure Pamin is set to be higher than the normal mode lower limit pressure Pmin, and therefore the anode gas pressure Pa decreases to a smaller extent during pressure pulsation in the recovery mode than in the normal mode. Hence, this control acts to suppress a reduction in the generated power.

When the anode gas pressure Pa falls to the recovery mode lower limit anode gas pressure Pamin at a time t14, the determination of the step S404 becomes negative during the next execution of the routine, and therefore the controller 51 increases the anode gas pressure Pa in the step S406. During subsequent executions of the routine, the determination of the step S401 is negative, and therefore the controller 51 performs processing to increase the anode gas pressure Pa in S408-S410 on the basis of the recovery mode upper limit anode gas pressure Pamax set in the step S407 thereafter. As a result, the anode gas pressure Pa increases continuously until it reaches the recovery mode upper limit anode gas pressure Pamax. The recovery mode upper limit anode gas pressure Pamax is set to be higher than the normal mode upper limit pressure Pmax, and therefore the anode gas pressure Pa increases to a greater extent during pressure pulsation in the recovery mode than in the normal mode. Hence, this control acts to promote recovery of the generated power.

When the anode gas pressure Pa reaches the recovery mode upper limit anode gas pressure Pamax at a time t15, the determination of the step S409 in FIG. 4 becomes negative, and therefore the controller 51 reduces the anode gas pressure Pa in the step S411. During subsequent executions of the routine, the determination of the step S401 is affirmative, and therefore the controller 51 performs processing to reduce the anode gas pressure Pa in S403-S405 on the basis of the recovery mode lower limit anode gas pressure Pamin set in the step S402 thereafter.

When the anode gas pressure Pa reaches the recovery mode lower limit anode gas pressure Pamin at a time t16, the controller 51 sets the recovery mode upper limit anode gas pressure Pamax again in the step S407 and then performs processing to increase the anode gas pressure Pa in the steps S408-S410.

Hence, by executing the routine of FIG. 3 and the sub-routines of FIGS. 4-6, the controller 51 continuously performs anode gas pressure pulsation operation control in the recovery mode.

When the stack voltage V recovers to a predetermined voltage at a time t17, the determination of the step S1 becomes affirmative. Thereafter, the controller 51 performs anode gas pressure pulsation operation control in the normal mode.

When the anode gas supply amount is insufficient for the target generated power, the amount of anode gas required to achieve the target generated power can be supplied by performing a pulsation operation while keeping the anode gas pressure in the fuel cell stack 1 slightly high. Therefore, according to this operation control device, a reduction in the generated power of the fuel cell stack 1 is less likely to occur even when a pressure pulsation operation is performed while the fuel cell stack 1 is flooded.

A water discharge capacity for discharging the generated water from the fuel cell stack 1 is believed to be dependent on a product of an anode gas flow speed and a pressure increasing time. According to this operation control device, the recovery mode upper limit anode gas pressure Pamax is set to be higher than the normal mode upper limit pressure Pmax, and therefore, in the recovery mode, the anode gas flow speed through the fuel cell stack 1 is maintained at a high level. As a result, a favorable water discharge capacity can be maintained.

The load current I and the stack voltage V of the fuel cell stack 1 decrease greatly as the deficiency in the amount of anode gas supplied to the fuel cell stack 1 increases. On the map having the characteristics shown in FIG. 7, steadily greater values are applied respectively to the recovery mode lower limit anode gas pressure Pamin and the recovery mode upper limit anode gas pressure Pamax as the load current I and the stack voltage V decrease, or in other words as the deficiency in the anode gas amount increases. In this operation control device, a pressure pulsation range is increased in accordance with the deficiency in the anode gas amount, and therefore deterioration of a power generation condition can be prevented through a minimal pressure increase.

Further, in this operation control device, the fuel cell power plant is returned to the normal mode pressure pulsation operation when the deficiency in the anode gas amount is eliminated, and therefore the power generation condition can be maintained, or deterioration thereof can be prevented, by increasing the anode gas pressure by a required minimum.

According to this operation control device, when the stack voltage V does not return to the predetermined voltage even after performing the recovery mode pressure pulsation operation continuously for a predetermined time, the recovery impossible processing is performed by opening the purge valve 25 or reducing the load voltage of the fuel cell stack 1. Therefore, when deterioration of the power generation condition cannot be prevented by controlling the anode gas pressure alone, deterioration of the power generation condition can be prevented by other means.

Figure 9:
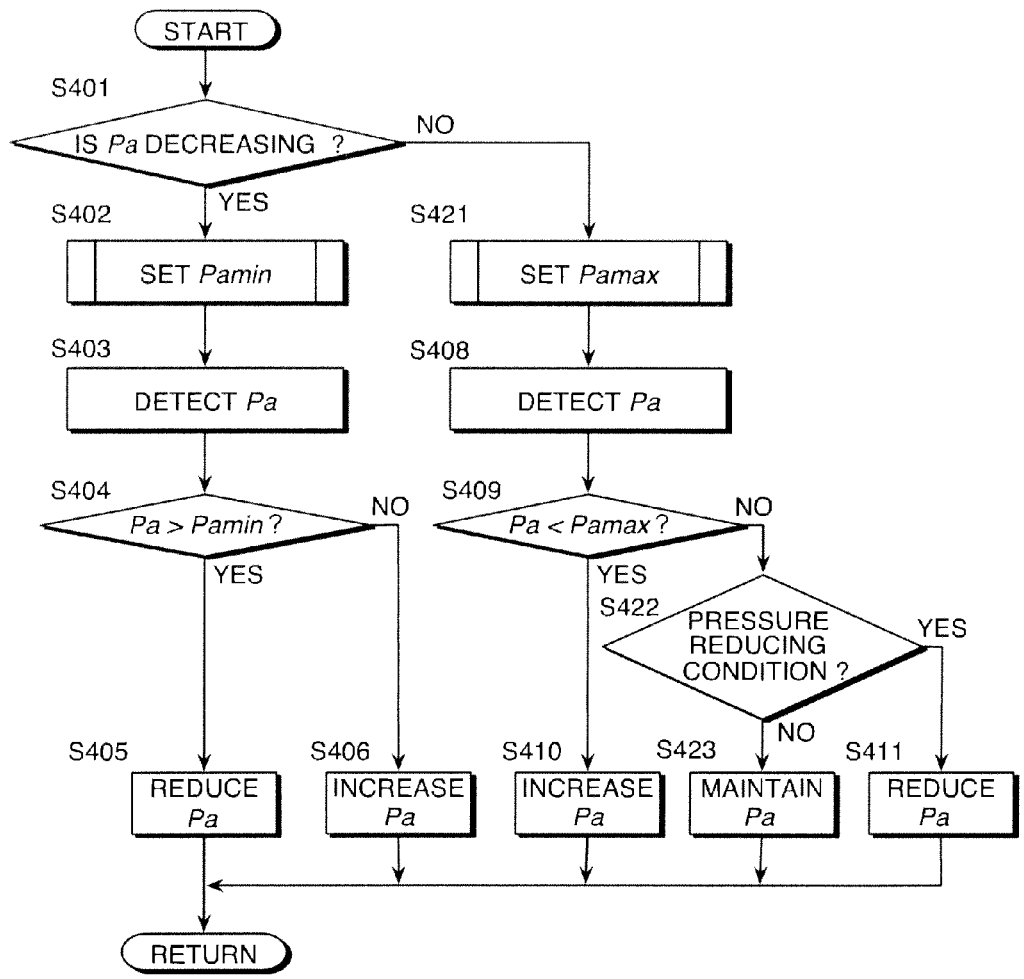
FIG. 9 is a flowchart illustrating a recovery mode sub-routine executed by a controller according to a second embodiment of this invention.
Figure 10:
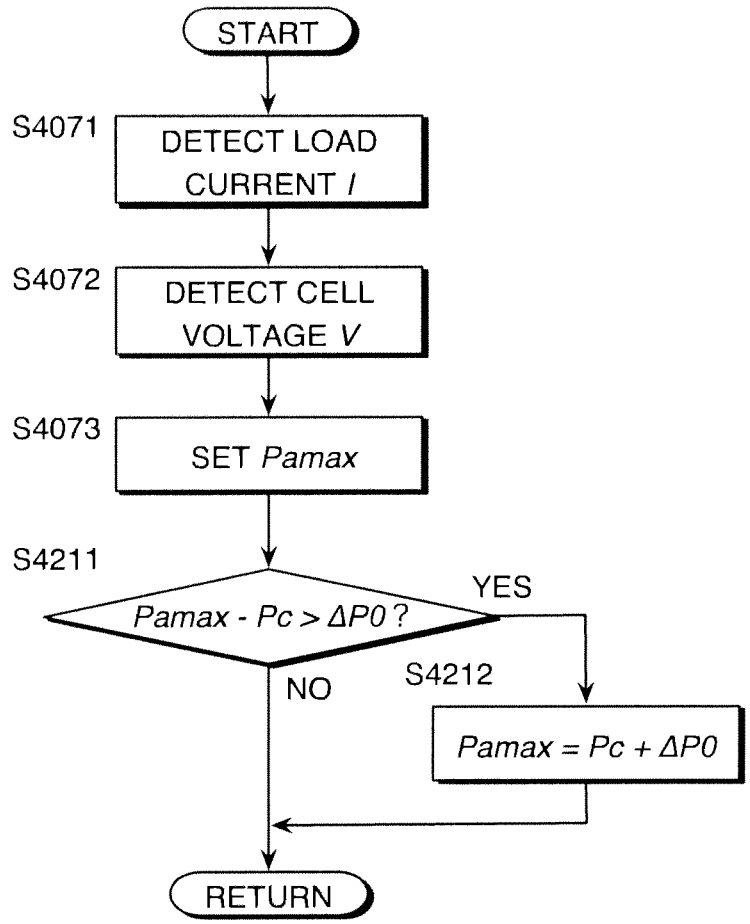
FIG. 10 is a flowchart illustrating a recovery mode upper limit anode gas pressure setting sub-routine executed by the controller according to the second embodiment of this invention.
Figure 11:
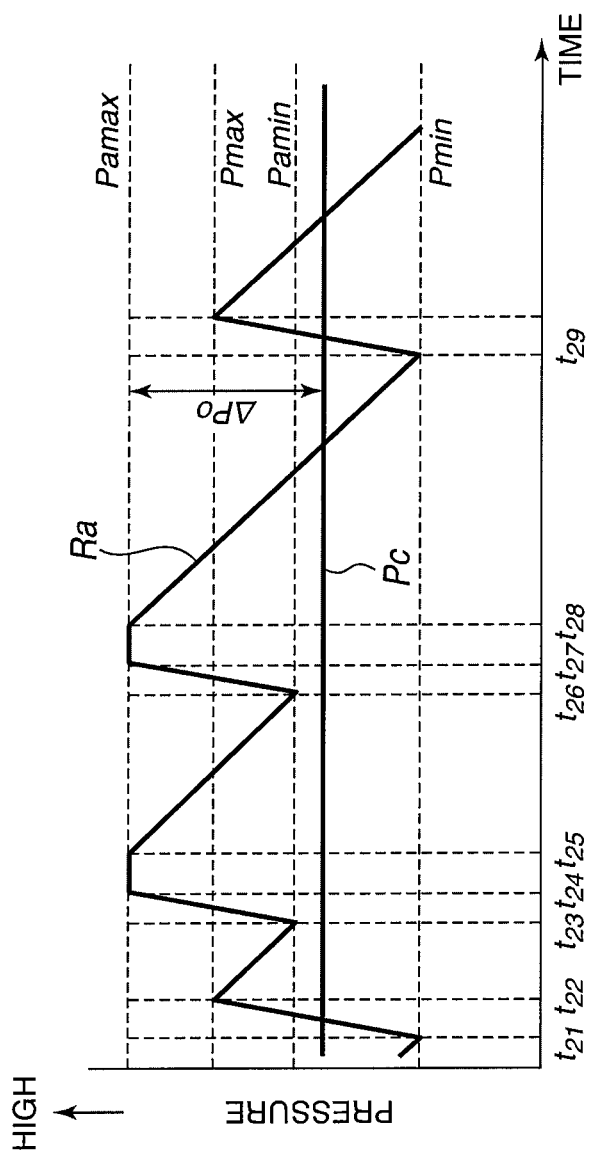
FIG. 11 is a timing chart illustrating results of reactant gas pressure control executed by the controller according to the second embodiment of this invention.

Referring to FIGS. 9-11, a second embodiment of this invention, relating to the recovery mode sub-routine and the recovery mode upper limit anode gas pressure setting sub-routine executed by the controller 51, will be described.

This embodiment differs from the first embodiment in that a limitation is added to the recovery mode upper limit anode gas pressure Pamax during the recovery mode pressure pulsation operation to ensure that the anode gas pressure does not become excessive relative to the cathode gas pressure. For this purpose, the operation control device according to this embodiment further includes a pressure sensor 56 that detects a cathode gas pressure Pc, as shown in FIG. 1.

The recovery mode sub-routine according to this embodiment, shown in FIG. 9, corresponds to the recovery mode sub-routine of the first embodiment, shown in FIG. 4, and is executed in the step S4 of the reactant gas pressure control routine of FIG. 3.

The recovery mode upper limit anode gas pressure setting sub-routine according to this embodiment, shown in FIG. 10, corresponds to the recovery mode upper limit anode gas pressure setting sub-routine of the first embodiment, shown in FIG. 6, and is executed in the step S421 of the recovery mode sub-routine of FIG. 9.

In the following description relating to FIGS. 9 and 10, steps in which identical processing to that of the first embodiment is performed have been allocated identical step numbers and description thereof has been omitted.

Referring to FIG. 9, the recovery mode sub-routine according to this embodiment will be described.

In the step S401, the controller 51 determines whether or not the anode gas pressure in the fuel cell stack 1 is decreasing, and when the determination is negative, the controller 51 sets the recovery mode upper limit anode gas pressure Pamax in the step S421 by executing the recovery mode upper limit anode gas pressure setting sub-routine shown in FIG. 10.

Referring to FIG. 10, after executing the processing of the steps S4071-S4073 in a similar manner to the first embodiment, the controller 51 determines in a step S4211 whether or not a differential pressure between the recovery mode upper limit anode gas pressure Pamax and the cathode gas pressure Pc detected by the pressure sensor 56 exceeds an allowable differential pressure $\Delta P0$. The allowable differential pressure $\Delta P0$ is set in advance through experiments and simulations at a value that does not permit a dramatic reduction in a durability of the fuel cell stack 1. A typical value of the allowable differential pressure $\Delta P0$ is between 50 and 200 kilopascals (kPa).

When the determination of the step S4211 is affirmative, the controller 51 resets the recovery mode upper limit anode gas pressure Pamax at a value obtained by adding the allowable differential pressure $\Delta P0$ to the cathode gas pressure Pc in a step S4212. Following the processing of the step S4212, the controller 51 terminates the recovery mode upper limit anode gas pressure setting sub-routine.

When the determination of the step S4211 is negative, on the other hand, the controller 51 terminates the recovery mode upper limit anode gas pressure setting sub-routine without adding a limitation to the recovery mode upper limit anode gas pressure Pamax.

Referring back to FIG. 9, in the step S409, the controller 51 determines whether or not the anode gas pressure Pa is lower than the recovery mode upper limit anode gas pressure Pamax, similarly to the first embodiment. The recovery mode upper limit anode gas pressure Pamax used here, however, takes a value limited by the value obtained by adding the allowable differential pressure $\Delta P0$ to the cathode gas pressure Pc.

When the determination of the step S409 is affirmative, the controller 51 increases the anode gas pressure in the step S410, similarly to the first embodiment, and then terminates the recovery mode sub-routine.

When the determination of the step S409 is negative, the controller 51 determines in a step S422 whether or not a pressure reducing condition of the anode gas pressure Pa is established. The pressure reducing condition of the anode gas pressure Pa is determined according to whether or not a required time following a point at which the determination of the step S409 switches from affirmative to negative has reached a predetermined time, for example.

When the determination of the step S422 is negative, or in other words when the required time following the point at which the determination of the step S409 switches from affirmative to negative has not reached the predetermined time, the controller 51 maintains the anode gas pressure Pa as is in a step S423.

When the determination of the step S422 is affirmative, or in other words when the required time following the point at which the determination of the step S409 switches from affirmative to negative has reached the predetermined time, the controller 51 reduces the anode gas pressure Pa in the step S411.

Following the processing of the step S423 or the step S411, the controller 51 terminates the recovery mode sub-routine.

Referring to FIG. 11, as a result of the control described above, the recovery mode upper limit anode gas pressure Pamax is suppressed to be lower than that of the first embodiment. On the other hand, during a period between times t24 and t25 and a period between times t27 and t28, the anode gas pressure Pa is maintained at the recovery mode upper limit anode gas pressure Pamax.

According to this embodiment, a limitation is added to the recovery mode upper limit anode gas pressure Pamax so that a differential pressure Pa-Pc between the anode gas and the cathode gas does not exceed the allowable differential pressure $\Delta P0$, and when the anode gas pressure Pa reaches the recovery mode upper limit anode gas pressure Pamax, the anode gas pressure Pa is maintained at the recovery mode upper limit anode gas pressure Pamax for a predetermined period rather than reducing the anode gas pressure Pa immediately.

By setting the differential pressure between the anode gas and the cathode gas at or below the allowable differential pressure $\Delta P0$, a reduction in the durability of the fuel cell stack 1 caused by an excessive differential pressure can be prevented. Further, by maintaining the recovery mode upper limit anode gas pressure Pamax within the range of the allowable differential pressure $\Delta P0$ for a predetermined period, the anode gas amount required to maintain the power generation condition or recover from deterioration of the power generation condition can be secured.

Figure 12:
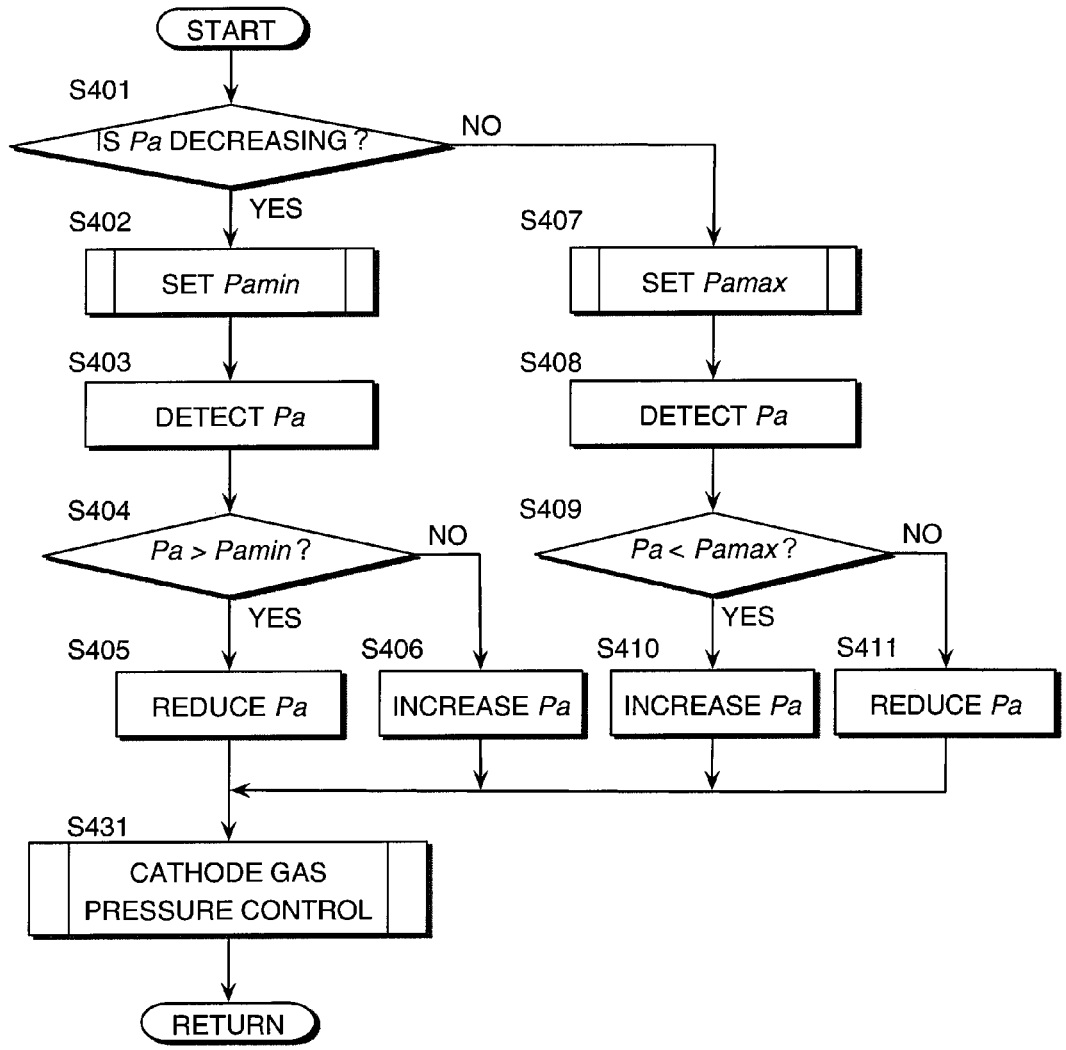
FIG. 12 is a flowchart illustrating a recovery mode sub-routine executed by a controller according to a third embodiment of this invention.
Figure 13:
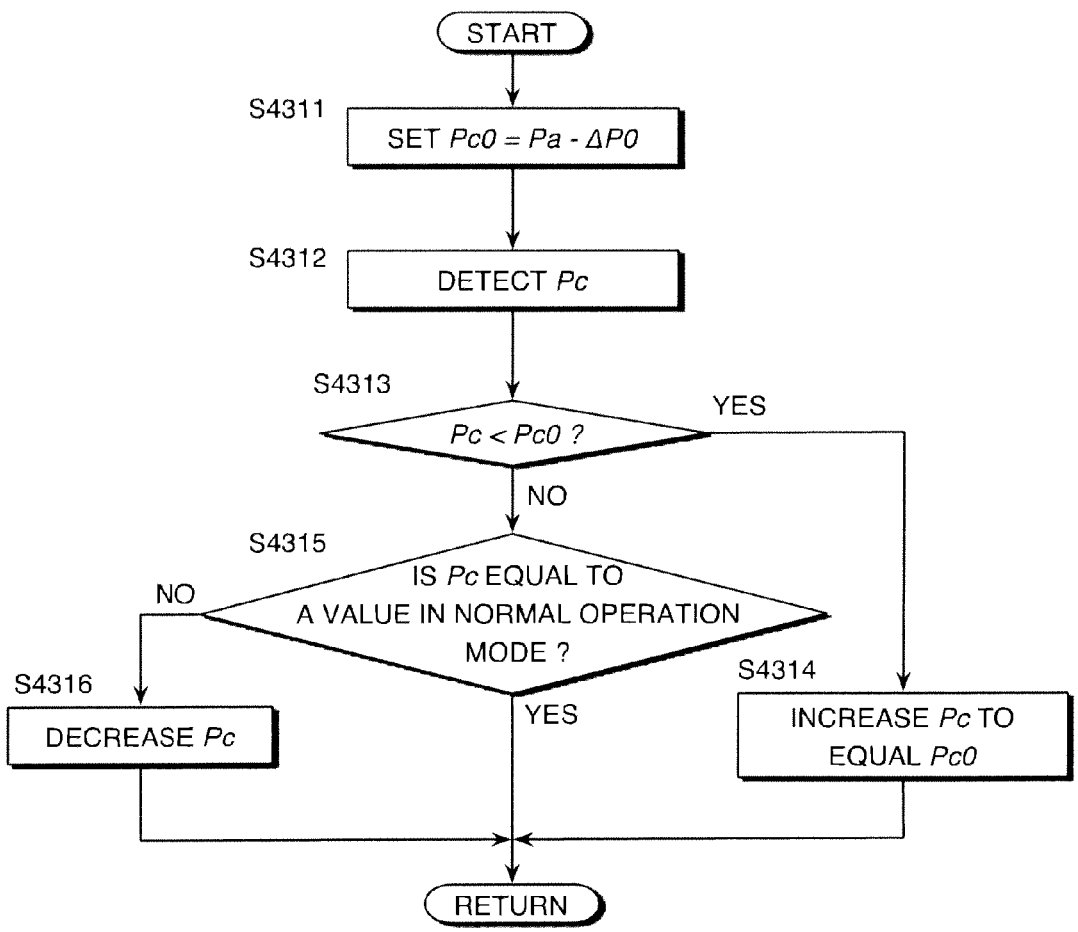
FIG. 13 is a flowchart illustrating a cathode gas pressure control sub-routine executed by the controller according to the third embodiment of this invention.
Figure 14:
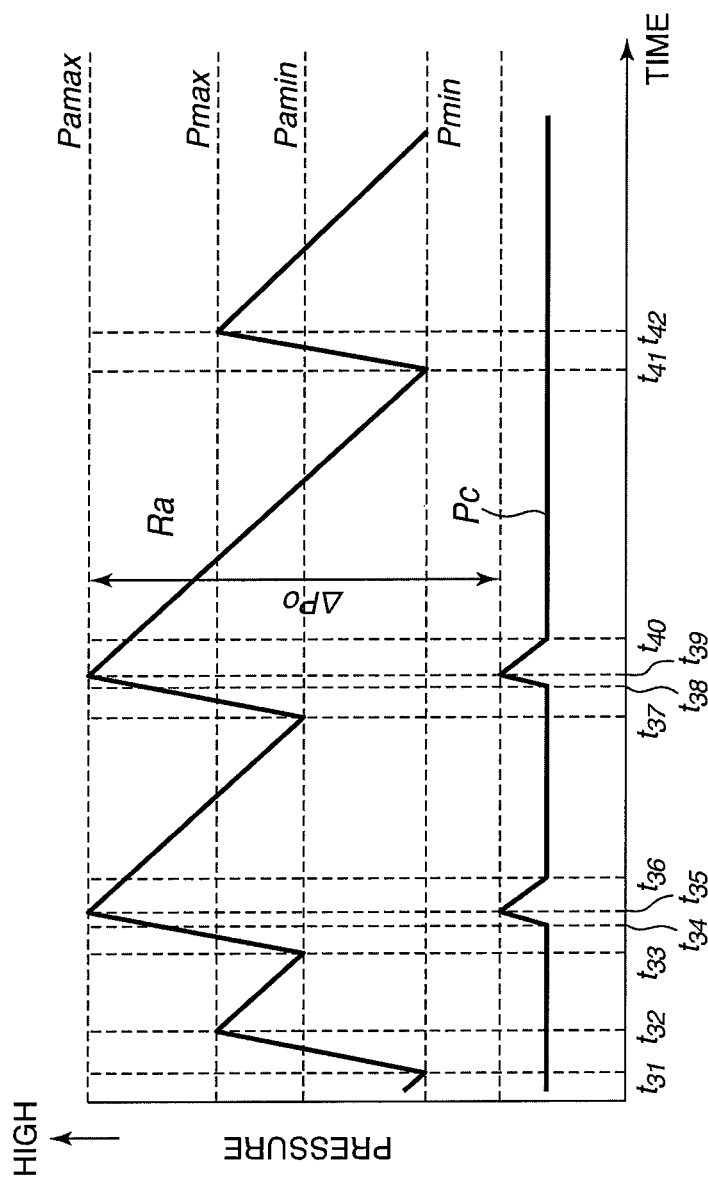
FIG. 14 is a timing chart illustrating results of reactant gas pressure control executed by the controller according to the third embodiment of this invention.

Referring to FIGS. 12-14, a third embodiment of this invention will be described.

In the first and second embodiments, the controller 51 controls the anode gas pressure alone, but in this embodiment, the controller 51 controls the cathode gas pressure as well as the anode gas pressure.

A recovery mode sub-routine according to this embodiment, shown in FIG. 12, corresponds to the recovery mode sub-routine of the first embodiment, shown in FIG. 4, and is executed in the step S4 of the reactant gas pressure control routine of FIG. 3. A step S431 that does not exist in the other embodiments is provided in the recovery mode sub-routine according to this embodiment.

Referring to FIG. 12, the processing of the steps S401-S411 is identical to that of the first embodiment. Following the processing of one of the steps S405, S406, S410, and S411, the controller 51 executes a cathode gas pressure control sub-routine shown in FIG. 13 in the step S431.

Referring to FIG. 13, in a step S4311, the controller 51 sets a recovery mode lower limit cathode gas pressure Pc0 by subtracting the allowable differential pressure $\Delta P0$ from the anode gas pressure Pa. The allowable differential pressure $\Delta P0$ is identical to the allowable differential pressure $\Delta P0$ used in the second embodiment.

In a step S4312, the controller 51 detects the cathode gas pressure Pc from an output signal of the pressure sensor 56.

In a step S4313, the controller 51 determines whether or not the cathode gas pressure Pc is lower than the recovery mode lower limit cathode gas pressure Pc0.

When the determination of the step S4313 is affirmative, the controller performs processing to increase the cathode gas pressure Pc by controlling the operation of the compressor 11 in a step S4314. Following the processing of the step S4314, the controller 51 terminates the cathode gas pressure control sub-routine.

When the determination of the step S4313 is negative, on the other hand, the controller 51 determines in a step S4315 whether or not the cathode pressure Pc is equal to a normal mode cathode pressure. When the cathode pressure Pc is equal to the normal mode cathode pressure, the controller 51 terminates the cathode gas pressure control sub-routine without applying processing to the cathode pressure Pc.

When the cathode pressure Pc is not equal to the normal mode cathode pressure, the controller 51 reduces the cathode pressure Pc in a step S4316. Following the processing of the step S4316, the controller 51 terminates the cathode gas pressure control sub-routine. In accordance with termination of the cathode gas pressure control sub-routine, the recovery mode sub-routine of FIG. 12 is terminated.

Referring to FIG. 14, as a result of the control described above, when the anode gas amount becomes insufficient in a pressure reducing stroke from a time t32 onward during the normal mode pressure pulsation operation, the controller 51 executes the recovery mode sub-routine of FIG. 12 in the step S4 of FIG. 3. In the recovery mode sub-routine, processing is performed to reduce the anode gas pressure Pa in the step S405 such that the anode gas pressure Pa reaches the recovery mode lower limit anode gas pressure Pamin at a time t33. As the anode gas pressure Pa decreases, the recovery mode lower limit cathode gas pressure Pc0 also decreases, and therefore the cathode pressure Pc does not fall below the recovery mode lower limit cathode gas pressure Pc0. Hence, as long as the anode gas pressure Pa decreases, the cathode pressure Pc is not increased during the cathode pressure control sub-routine of FIG. 13, executed in the step S431 of the recovery mode sub-routine.

After the anode gas pressure Pa reaches the recovery mode lower limit anode gas pressure Pamin at the time t33, the controller 51 performs processing to increase the anode gas pressure by controlling the operation of the compressor 11 in the step S406 and the step S410 of the recovery mode sub-routine shown in FIG. 12. As a result, the anode gas pressure Pa increases.

As the anode gas pressure Pa increases, the recovery mode lower limit cathode gas pressure Pc0 set in the step S4311 of the cathode gas pressure control sub-routine shown in FIG. 13 also increases. As a result, the cathode pressure Pc falls below the recovery mode lower limit cathode gas pressure Pc0 at a time t34, whereby the controller 51 performs processing to increase the cathode pressure Pc in the step S4314. Hence, from the time t34 onward, the cathode pressure Pc increases together with the anode pressure Pa.

At a time t35, the anode gas pressure Pa reaches the recovery mode upper limit anode gas pressure Pamax. Thereafter, the controller 51 performs processing to reduce the anode gas pressure Pa in the steps S411 and S406 of the recovery mode sub-routine shown in FIG. 12. Further, the controller 51 performs processing to reduce the cathode gas pressure Pc by controlling the operation of the compressor 11 in the step S4316 of FIG. 13. Thereafter, the anode gas pressure Pa and the cathode gas pressure Pc decrease while maintaining the differential pressure $\Delta P0$.

When the cathode gas pressure Pc decreases to a normal mode cathode pressure at a time t36, the determination of the step S4315 becomes affirmative, and therefore subsequent processing to reduce the cathode pressure Pc is stopped such that the cathode pressure Pc is maintained at the normal mode cathode pressure. On the other hand, the processing to reduce the anode gas pressure Pa is continued until the anode gas pressure Pa reaches the recovery mode lower limit anode gas pressure Pamin at a time t37.

The recovery mode pulsation operation control performed from the time t33 to the time t37 is repeated likewise after the time t37. From a time t40 onward, when the stack voltage V recovers to the predetermined voltage, the determination of the step S1 in the reactant gas pressure control routine of FIG. 3 switches from negative to affirmative. In accordance with this variation, the controller 51 switches the pressure pulsation operation control from the recovery mode to the normal mode such that thereafter, the normal mode pressure pulsation operation control is performed in the step S2.

According to this embodiment, the processing to increase the cathode gas pressure Pc is performed in accordance with the increase in the anode gas pressure Pa so that the differential pressure between the anode gas pressure Pa and the cathode gas pressure Pc does not exceed the allowable differential pressure $\Delta P0$. In so doing, a reduction in the durability of the fuel cell stack 1 caused by an excessive differential pressure can be prevented. Further, the anode gas pressure Pa is not prevented from rising to the recovery mode upper limit anode gas pressure Pamax, and therefore the anode gas amount required to maintain the power generation condition or recover from deterioration thereof can also be secured.

The contents of Tokugan 2009-160528 with a filing date of Jul. 7, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

Figure 15:
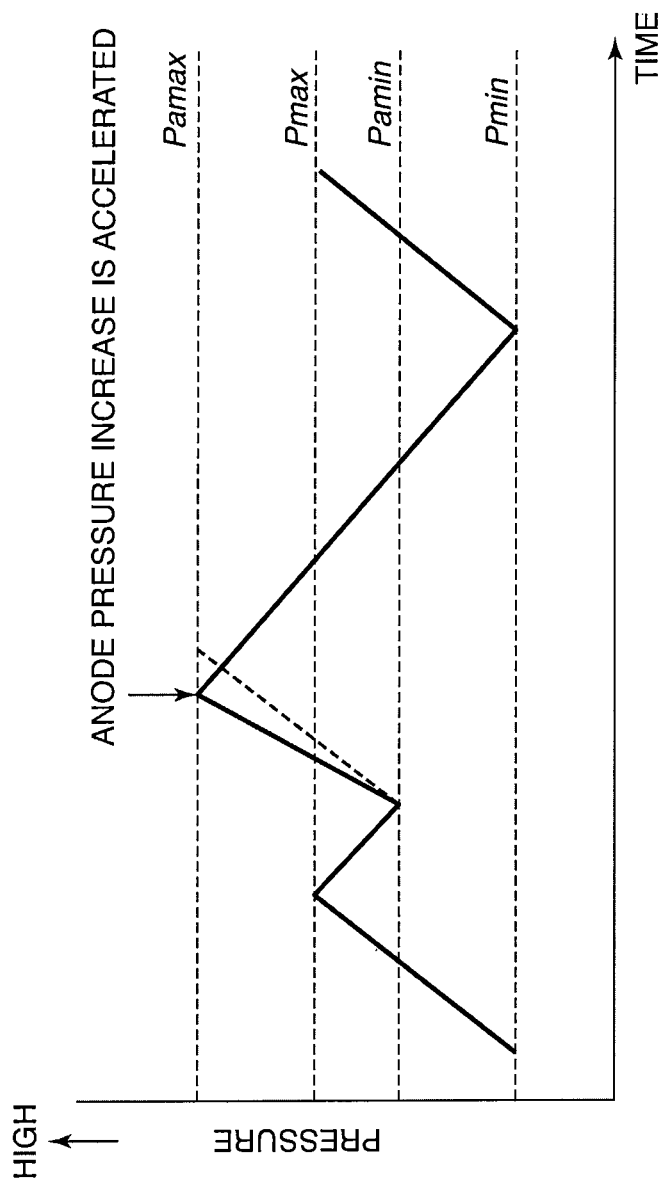
FIG. 15 is a diagram illustrating a variation of the pressure pulsation operation control according to this invention.

As shown in FIG. 15, for example, with respect to all of the embodiments described above, when the anode gas pressure Pa is increased in the recovery mode, an increase speed of the anode gas pressure is preferably raised such that the flow speed of the anode gas passing through the fuel cell stack 1 exceeds the flow speed thereof in the normal mode. More specifically, the predetermined opening of the hydrogen pressure-adjusting valve 22 applied to the processing for increasing the anode gas pressure Pa in the steps S406 and S410 is set at a larger value.

When the increase speed of the anode gas pressure Pa is raised, a pressure pulsation interval shortens such that a time required to switch from the recovery mode to the normal mode after the stack voltage V recovers to the predetermined voltage is reduced. As a result, the pressure pulsation operation in the recovery mode can be completed within a shorter period.

INDUSTRIAL FIELD OF APPLICATION

As described above, the control device and control method for a fuel cell power plant according to this invention exhibits favorable effects when applied to a fuel cell power plant for a vehicle, but is not limited thereto.

The embodiments of this invention in which an exclusive property or privilege is claimed are defined as follows:

The invention claimed is:

1. An operation control device for a fuel cell power plant having a target generated power, the operation control device being configured to control a generated power of a fuel cell stack that performs power generation using hydrogen on a basis of the target generated power, the operation control device comprising:
   an anode gas supply mechanism that supplies an anode gas containing hydrogen to the fuel cell stack;
   a sensor that detects a power generation condition of the fuel cell stack; and
   a programmable controller programmed to:
      determine on a basis of the power generation condition of the fuel cell stack whether or not a hydrogen supply amount supplied to the fuel cell stack satisfies an amount required to generate the target generated power;
      control the anode gas supply mechanism to cause an anode gas pressure in the fuel cell stack to pulsate between an upper limit pressure and a lower limit pressure in a normal mode when the hydrogen supply amount satisfies the amount required to generate the target generated power; and
      control the anode gas supply mechanism to cause the anode gas pressure in the fuel cell stack to pulsate between an upper limit pressure and a lower limit pressure in a recovery mode when the hydrogen supply amount does not satisfy the amount required to generate the target generated power,
   wherein the lower limit pressure in the recovery mode is set to a higher value than the lower limit pressure in the normal mode.

2. The operation control device as defined in claim 1, wherein the controller is further programmed to set the lower limit pressure in the recovery mode to a higher value as a deficiency in an anode gas supply amount increases.

3. The operation control device as defined in claim 1, wherein the sensor that detects the power generation condition comprises an ammeter that detects a load current of the fuel cell stack, and the controller is further programmed to set the lower limit pressure in the recovery mode to a higher value as the load current increases.

4. The operation control device as defined in claim 1, wherein the controller is further programmed to set the upper limit pressure in the recovery mode to a higher value than the upper limit pressure in the normal mode.

5. The operation control device as defined in claim 4, wherein the controller is further programmed to set the upper limit pressure in the recovery mode to a higher value as a deficiency in the hydrogen supply amount increases.

6. The operation control device as defined in claim 5, wherein the sensor that detects the power generation condition comprises an ammeter that detects a load current of the fuel cell stack, and the controller is further programmed to set the upper limit pressure in the recovery mode to a higher value as the load current increases.

7. The operation control device as defined in claim 4, wherein the controller is further programmed to set a difference between the upper limit pressure in the recovery mode and the upper limit pressure in the normal mode to be larger than a difference between the lower limit pressure in the recovery mode and the lower limit pressure in the normal mode.

8. The operation control device as defined in claim 4, wherein the controller is further programmed to shift the upper limit pressure in the recovery mode to the upper limit pressure in the normal mode when the hydrogen supply amount has come to satisfy the amount required to generate the target generated power after performing control of the anode gas supply mechanism to cause the anode gas pressure in the fuel cell stack to pulsate between the upper limit pressure and the lower limit pressure in the recovery mode.

9. The operation control device as defined in claim 1, wherein the fuel cell power plant further comprises:
   a cathode gas supply mechanism that supplies a cathode gas to the fuel cell stack; and
   a pressure sensor that detects a cathode gas pressure in the fuel cell stack,
   wherein the controller is further programmed to limit the upper limit pressure in the recovery mode by a pressure obtained by adding a predetermined pressure to the cathode gas pressure.

10. The operation control device as defined in claim 9, wherein the controller is further programmed to increase the cathode gas pressure to cause a differential pressure between the anode gas pressure and the cathode gas pressure not to exceed a predetermined pressure.

11. The operation control device as defined in claim 1, wherein the controller is further programmed to increase an increase speed of the anode gas pressure when increasing the anode gas pressure to the upper limit pressure in the recovery mode so that a flow speed of the anode gas passing through the fuel cell stack in the recovery mode exceeds the flow speed of the anode gas passing through the fuel cell stack in the normal mode.

12. The operation control device as defined in claim 1, wherein the controller is further programmed to shift the lower limit pressure in the recovery mode to the lower limit pressure in the normal mode when the hydrogen supply amount has come to satisfy the amount required to generate the target generated power after performing control of the anode gas supply mechanism to cause the anode gas pressure in the fuel cell stack to pulsate between the upper limit pressure and the lower limit pressure in the recovery mode.

13. The operation control device as defined in claim 1, wherein the controller is further programmed to perform recovery impossible processing when the hydrogen supply amount does not reach the amount required to generate the target generated power even after controlling the anode gas supply mechanism to cause the anode gas pressure in the fuel cell stack to pulsate between the upper limit pressure and the lower limit pressure in the recovery mode for a predetermined time.

14. The operation control device as defined in claim 13, wherein the anode gas supply mechanism comprises a buffer tank that collects and stores the anode gas supplied to the fuel cell stack from the fuel cell stack, and resupplies the stored anode gas to the fuel cell stack in accordance with a reduction in the anode gas pressure in the fuel cell stack.

15. The operation control device as defined in claim 14, wherein the recovery impossible processing comprises purging the stored anode gas in the buffer tank.

16. The operation control device as defined in claim 13, wherein the recovery impossible processing comprises reducing a load current of the fuel cell stack.

17. The operation control device as defined in claim 1, wherein the sensor that detects the power generation condition of the fuel cell stack comprises at least one of a voltmeter that detects a stack voltage of the fuel cell stack, an ammeter that detects the load current of the fuel cell stack, and a hydrogen concentration sensor that detects a hydrogen concentration of the anode gas supplied to the fuel cell stack.

18. A control device for a fuel cell power plant having a target generated power, the control device being configured to control a generated power of a fuel cell stack that performs a power generation operation using hydrogen on a basis of the target generated power, the control device comprising:
means for supplying an anode gas containing hydrogen to the fuel cell stack;
means for detecting a power generation condition of the fuel cell stack;
means for determining on a basis of the power generation condition of the fuel cell stack whether or not a hydrogen supply amount supplied to the fuel cell stack satisfies an amount required to generate the target generated power;
means for controlling the anode gas supply means to cause an anode gas pressure in the fuel cell stack to pulsate between an upper limit pressure and a lower limit pressure in a normal mode when the hydrogen supply amount satisfies the amount required to generate the target generated power; and
means for controlling the anode gas supply means to cause the anode gas pressure in the fuel cell stack to pulsate between an upper limit pressure and a lower limit pressure in a recovery mode when the hydrogen supply amount does not satisfy the amount required to generate the target generated power,
wherein the lower limit pressure in the recovery mode is set to a higher value than the lower limit pressure in the normal mode.

19. A control method for a fuel cell power plant having a target generated power, the control method performing a power generation operation on a basis of the target generated power using a fuel cell stack that performs power generation using hydrogen, the method comprising:
supplying an anode gas containing hydrogen to the fuel cell stack;
detecting a power generation condition of the fuel cell stack using a sensor;
determining on a basis of the power generation condition of the fuel cell stack whether or not a hydrogen supply amount supplied to the fuel cell stack satisfies an amount required to generate the target generated power;
controlling an anode gas pressure in the fuel cell stack to pulsate between an upper limit pressure and a lower limit pressure in a normal mode when the hydrogen supply amount satisfies the amount required to generate the target generated power; and
controlling the anode gas pressure in the fuel cell stack to pulsate between an upper limit pressure and a lower limit pressure in a recovery mode when the hydrogen supply amount does not satisfy the amount required to generate the target generated power,
wherein the lower limit pressure in the recovery mode is set to a higher value than the lower limit pressure in the normal mode.

20. The operation control device as defined in claim 1, wherein the programmable controller is programmed to cause the anode gas pressure in the fuel cell stack to pulsate between a dynamically changing upper limit pressure and a dynamically changing lower limit pressure in the recovery mode, and
wherein the dynamically changing upper limit pressure and the dynamically changing lower limit pressure in the recovery mode are changed based on the power generation condition of the fuel cell stack detected by the sensor.

* * * * *